United States Patent
Li et al.

(10) Patent No.: US 11,108,940 B2
(45) Date of Patent: Aug. 31, 2021

(54) MULTI-VIEW CAMERA AND LENS ADJUSTMENT DEVICE

(71) Applicant: Hangzhou Hikvision Digital Technology Co., Ltd., Hangzhou (CN)

(72) Inventors: Yang Li, Hangzhou (CN); Caisheng Yan, Hangzhou (CN); Zhiqiang Rong, Hangzhou (CN); Man Jiang, Hangzhou (CN); Zhan Ye, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/046,585

(22) PCT Filed: Mar. 28, 2019

(86) PCT No.: PCT/CN2019/080195
§ 371 (c)(1),
(2) Date: Oct. 9, 2020

(87) PCT Pub. No.: WO2019/196671
PCT Pub. Date: Oct. 17, 2019

(65) Prior Publication Data
US 2021/0092265 A1    Mar. 25, 2021

(30) Foreign Application Priority Data

Apr. 11, 2018  (CN) .......................... 201810324574.2
Apr. 11, 2018  (CN) .......................... 201820512260.0

(51) Int. Cl.
*H04N 5/225*  (2006.01)
*G03B 17/56*  (2021.01)
*G03B 17/12*  (2021.01)

(52) U.S. Cl.
CPC .......... *H04N 5/2254* (2013.01); *G03B 17/12* (2013.01); *G03B 17/561* (2013.01)

(58) Field of Classification Search
CPC .... H04N 5/2254; G03B 17/561; G03B 17/12; G08B 13/1963
See application file for complete search history.

(56) References Cited

U.S. PATENT DOCUMENTS 6,056,450 A    5/2000  Walling
9,535,311 B2 *  1/2017  Bergsten .......... G08B 13/19623
(Continued)

FOREIGN PATENT DOCUMENTS

CN    208079236    11/1918
CN    101782713    7/2010
(Continued)

OTHER PUBLICATIONS

International Search Report and Written Opinion issued in Corresponding PCT Application No. PCT/CN2019/080195, dated Jul. 5, 2019 (English translation provided).
(Continued)

*Primary Examiner* — Abdelaaziz Tissire
(74) *Attorney, Agent, or Firm* — Norton Rose Fulbright US LLP

(57) ABSTRACT

A multi-lens camera and a lens adjustment device, the multi-lens camera includes a main housing assembly, lenses, and a lens adjustment device; the main housing assembly includes a main housing and an inner baffle arranged at the top opening of the main housing; the inner baffle and the main housing constitute a main board cavity; a main board is arranged in the main board cavity; the area of the main board is less than that of the main board cavity, the lenses are mounted on the lens adjustment device, and the overall area of the lenses and the lens adjustment device is within the
(Continued)

area of the support region of the inner baffle; the lens adjustment device includes a cylindrical component and at least two lens brackets, the lenses are mounted on the lens brackets, which are connected with the component to drive the lenses to rotate around the component.

18 Claims, 7 Drawing Sheets

(56) References Cited

U.S. PATENT DOCUMENTS

| | | | | |
|---|---|---|---|---|
| 10,388,133 | B1* | 8/2019 | Kondou | G03B 17/00 |
| 2008/0107413 | A1* | 5/2008 | Moore | G03B 17/561 |
| | | | | 396/428 |
| 2008/0248703 | A1* | 10/2008 | Russell | B63B 1/10 |
| | | | | 441/136 |
| 2011/0234807 | A1 | 9/2011 | Jones et al. | |
| 2012/0138763 | A1* | 6/2012 | Russell | F16M 11/242 |
| | | | | 248/310 |
| 2012/0224843 | A1* | 9/2012 | Hung | G02B 7/08 |
| | | | | 396/529 |
| 2012/0288269 | A1* | 11/2012 | Jensen | F16M 11/242 |
| | | | | 396/428 |
| 2014/0153916 | A1* | 6/2014 | Kintner | G03B 17/561 |
| | | | | 396/419 |
| 2014/0212124 | A1* | 7/2014 | Huang | G02B 7/023 |
| | | | | 396/529 |
| 2015/0358538 | A1* | 12/2015 | Donaldson | G03B 17/55 |
| | | | | 348/38 |
| 2016/0191813 | A1* | 6/2016 | Wu | H04N 5/2252 |
| | | | | 348/159 |
| 2016/0353022 | A1 | 12/2016 | Mueller et al. | |
| 2017/0155888 | A1 | 6/2017 | Prechtl | |
| 2017/0255083 | A1 | 9/2017 | Donaldson | |
| 2019/0191059 | A1* | 6/2019 | Park | H04N 7/181 |
| 2019/0327398 | A1* | 10/2019 | Shin | G03B 17/08 |
| 2019/0327420 | A1* | 10/2019 | Schieltz | G08B 13/1963 |
| 2019/0368613 | A1* | 12/2019 | Little | F16J 15/3224 |
| 2020/0324700 | A1* | 10/2020 | Asfaw | G01S 13/931 |
| 2020/0389603 | A1* | 12/2020 | Li | G03B 17/12 |

FOREIGN PATENT DOCUMENTS

| | | |
|---|---|---|
| CN | 102333187 | 1/2012 |
| CN | 103592314 | 2/2014 |
| CN | 204272255 | 4/2015 |
| CN | 204425495 | 6/2015 |
| CN | 107529053 | 12/2017 |
| EP | 3168819 | 5/2017 |
| KR | 20100095260 | 8/2010 |
| KR | 20120122258 | 11/2012 |
| WO | WO 2016/053023 | 4/1916 |

OTHER PUBLICATIONS

Notification to Grant Patent issued in Corresponding Chinese Application No. 201810324574.2, dated Jun. 29, 2020 (English translation provided).
Office Action issued in Corresponding Chinese Application No. 201810324574.2, dated Mar. 6, 2020 (English translation provided).
"Ferrule." Wikipedia, 2018, https://en.wikipedia.org/w/index.php?title=Ferrule&oldid=830074263. Accessed Mar. 10, 2021.
Extended European Search Report issued in Corresponding European Application No. 19785791.5, dated Mar. 23, 2021.

* cited by examiner

MULTI-VIEW CAMERA AND LENS ADJUSTMENT DEVICE

CROSS REFERENCE TO RELATED APPLICATIONS

The present application is a national phase application under 35 U.S.C. § 371 of International Application No. PCT/CN2019/080195, filed Mar. 28, 2019, which claims the benefit of priority to Chinese Patent Application No. 201820512260.0, filed with the China National Intellectual Property Administration on Apr. 11, 2018 and entitled "Multi-lens camera and lens adjustment device", and Chinese Patent Application No. 201810324574.2, filed with the China National Intellectual Property Administration on Apr. 11, 2018 and entitled "Multi-lens camera", each of which are incorporated herein by reference in their entirety.

TECHNICAL FIELD

This application relates to the technical field of camera design, and in particular to a multi-lens camera and a lens adjustment device.

BACKGROUND

A multi-lens camera, as typically used camera equipment, has a plurality of lenses on the camera body arranged along the circumference direction thereof. Multi-lens cameras are divided into fixed multi-lens cameras and adjustable multi-lens cameras according to whether the lenses are fixed. Each lens of the adjustable multi-lens cameras can perform a three-axis adjustment independently, that is, each lens can perform an angle adjustment in the P, T, and R directions, thereby achieving the adjustment of a photographing angle. Images taken by a plurality of lenses can synthesize a panoramic image for the multi-lens camera.

Generally, the lens is fixed on a mounting disc by means of a lens bracket. During the P-direction adjustment, the mounting disc is rotatable relative to the camera body, thereby achieving the rotation of the lens in a direction parallel to the mounting disc, that is, achieving the P-direction adjustment. When the lens is adjusted in place, the mounting disc will be locked relative to the camera body with fastening screws, thereby enabling the lens to be maintained in the adjusted position. Locking the mounting disc with fastening screws requires frequent loosening and tensioning operations, which has the problems of cumbersome operation and low operation efficiency.

SUMMARY

An embodiment of the present application provides a multi-lens camera and a lens adjustment device, to solve the problems of cumbersome operation and low operation efficiency in the P-direction adjusting process of the lens of the current multi-lens camera. The specific technical solutions are as follows.

In a first aspect, the embodiment of the present application provides a lens adjustment device of a multi-lens camera, which includes a cylindrical component 100 and at least two lens brackets 200. The lens bracket 200 includes a first bracket 210, the first bracket 210 includes a ferrule 211 and a bracket body 212 for mounting a lens 300, the bracket body 212 is fixedly connected to the ferrule 211, and the ferrule 211 is sleeved on the cylindrical component 100 and is rotatable around the cylindrical component 100.

In a second aspect, the embodiment of the present application provides a multi-lens camera, which includes lenses 300 and a lens adjustment device. The lenses 300 are mounted on the lens adjustment device, and the lens adjustment device is any of the lens adjusting devices in the first aspect mentioned above.

In a third aspect, the embodiment of the present application provides a multi-lens camera, which includes a main housing assembly 400, a lens 300, and a lens adjustment device. The main housing assembly 400 includes a main housing 410 and an inner baffle 420 arranged at a top opening of the main housing 410. The inner baffle 420 and the main housing 410 constitute a main board cavity 430, a main board 800 is arranged in the main board cavity 430, and the area of the main board 800 is less than that of the main board cavity 430. The lenses 300 are mounted on the lens adjustment device, and the overall area of the lens 300 and the lens adjustment device is within the area of the support region of the inner baffle 430. The lens adjustment device includes a cylindrical component 100 and at least two lens brackets 200, the lenses 300 are mounted on the lens brackets 200. The lens brackets 200 are connected with the cylindrical component 100 and are able to drive the lenses 300 to rotate around the cylindrical component 100.

In the lens adjustment device and the multi-lens camera disclosed in the embodiment of the present application, the cylindrical component of the lens adjustment device is fixed on the main housing assembly, the lens brackets mounted with the lenses are engaged with the cylindrical component, which can drive the lenses to rotate around the cylindrical component. The operator can drive the lenses to rotate by applying a certain driving force, thereby achieving the P-direction adjustment of the lenses. Compared with the background art, the adjustment operation of the lenses mentioned above is simple and the adjustment efficiency is high.

BRIEF DESCRIPTION OF THE DRAWINGS

In order to illustrate the technical solutions of the embodiments of the present application or of the prior art more clearly, the drawings used in the embodiments or in the prior art will be briefly described below. Obviously, the drawings described below are just some embodiments of the present application and other drawings may be obtained by those skilled in the art based on these drawings without any creative effort.

LIST OF REFERENCE NUMBERS

Figure 1:
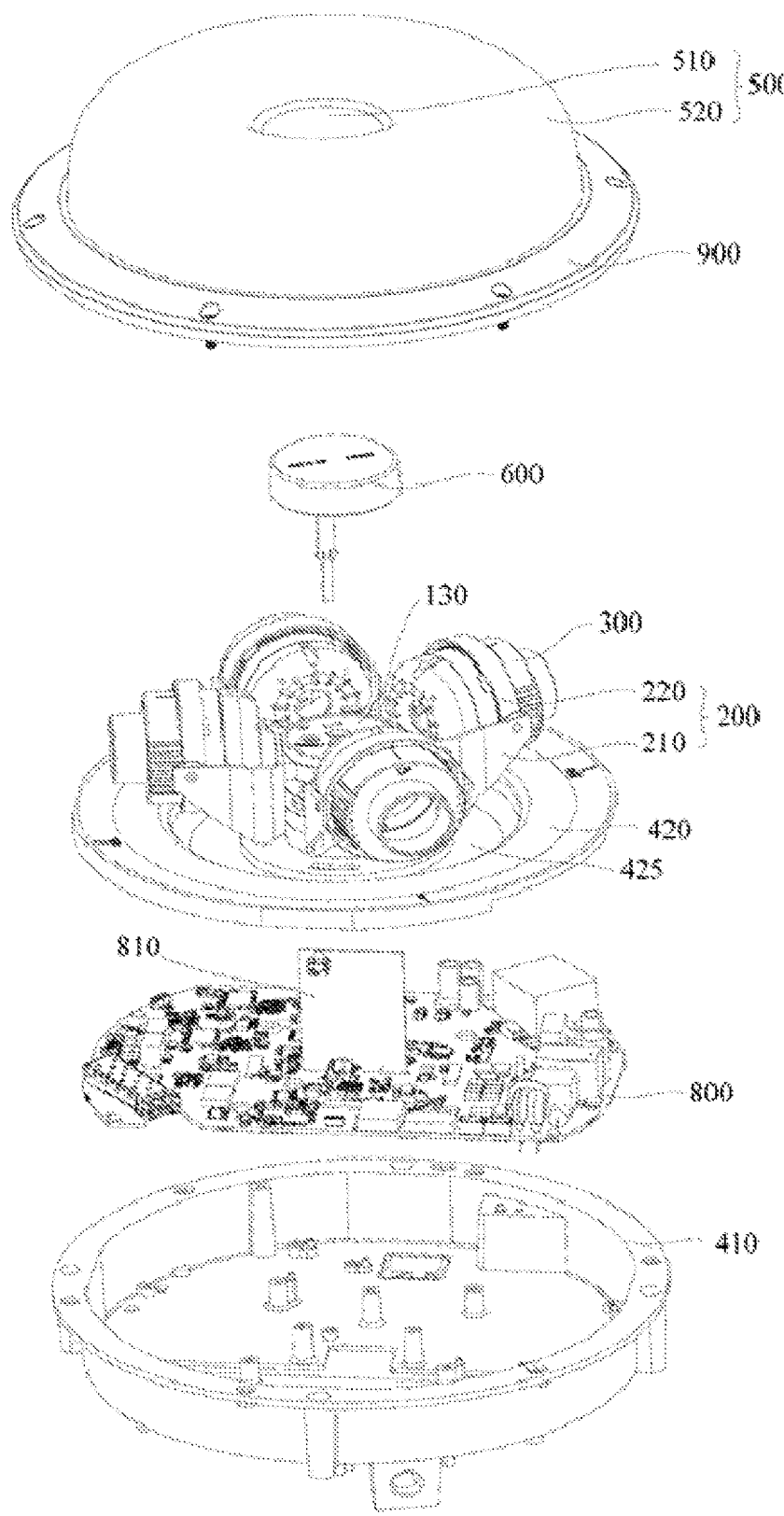
FIG. 1 is a schematic diagram of an exploded structure of a multi-lens camera according to an embodiment of the present application.

100—cylindrical component, 110—first tooth slot, 120—cylindrical cavity, 130—cap, 131—interface, 140—snap slot, 150—connecting pillar;

200—lens bracket, 210—first bracket, 211—ferrule, 211*a*—first engaging tooth, 212—bracket body, 213—gap-compensating elastic pad, 212*a*—support arm, 212*a*1—tensioning protrusion, 212*a*2—first position-limiting part, 212*a*3—support arm body, 212*a*4—fixing block, 212*a*5—mounting hole;

220—second bracket, 221—tensioning disc, 221*a*—tensioning slot, 221*b*—second position-limiting part, 222—annular structure member, 222*a*—second engaging teeth, 222*b*—fastener, 222*c*—protrusion stop, 222*d*—third position-limiting part;

300—lens, 310—second tooth slot, 320—fourth position-limiting part;

400—main housing assembly, 410—main housing, 411—first support pillar, 412—second support pillar, 412*a*—thread hole, 412*b*—positioning protrusion, 413—third support pillar, 420—inner baffle, 421—cable holes, 422—avoidance hole, 423—positioning holes, 424—second connecting holes, 425—recess, 430—main board cavity;

500—transparent cover, 510—flat portion, 520—curved portion, 600—elastic pad, 700—lens accommodating space, 800—main board, 810—external interface board, 820—first connecting hole, 830—first perforation, 840—second perforation, 900—pressing ring.

DETAILED DESCRIPTION OF THE INVENTION

In order to explain the purpose, technical solutions, and advantages of the present application more clearly, the present application is described in detail with reference to the drawings and embodiments below. Obviously, the embodiments described are only a part, but not all of the embodiments of the present application. Based on the embodiments of the present application, all other embodiments obtained by those skilled in the art without any creative effort should fall within the scope of protection of the present application.

The technical solutions provided in various embodiments of the present application will be described in detail with reference to the drawings.

Referring to FIGS. 1-10, the present application discloses a lens adjustment device of a multi-lens camera, which includes a cylindrical component 100 and at least two lens brackets 200. The cylindrical component 100 provides a mounting base for the lens brackets 200 and lenses 300, the lenses 300 are arranged on the cylindrical component 100 by means of the brackets 200. The cylindrical component 100 is fixedly connected to a main housing assembly 400 of the multi-lens camera.

The lens brackets 200 are connected with the cylindrical component 100 and are able to drive lenses 300 to rotate around the cylindrical component 100. The engagement between the brackets 200 and the cylindrical component 100 is an tension fit, that is, the brackets 200 requires an external force (a driving force mentioned below) to rotate around the cylindrical component 100, thereby driving the lenses 300 to rotate.

Specifically, the lens brackets 200 may engage with the cylindrical component 100, and drive the lenses 300 to rotate around the cylindrical component 100, so that the lenses 300 can rotate in a plane perpendicular to the axis of the cylindrical component 100, so as to achieve the P-direction adjustment of lenses 300. During the adjustment, the engagement between the lens brackets 200 and the cylindrical component 100 is a tension fit, and the operator can drive the lens brackets 200 to rotate around the cylindrical component 100 by applying a certain driving force, thereby achieving the rotation of the lenses 300 around the cylindrical component 100.

Specifically, the engagement between the lens brackets 200 and the cylindrical component 100 means that: when the lens brackets 200 are subjected to an external force, they can be in an engaging and positioning state, so as to ensure that the lenses 300 mounted on the lens brackets 200 are remained in the current position; when the lens brackets 200 are subjected to an external force, the lens brackets 200 can rotate around the cylindrical component 100, thereby driving the lenses 300 to rotate.

The lens brackets 200 may include a first bracket 210, a lens 300 may be mounted on the first bracket 210, the first bracket 210 may be engaged with the cylindrical component 100 and drive the lens 300 to rotate around the cylindrical component 100.

There are a plurality of assembly manners for the rotation of the first bracket 210 around the cylindrical component 100. In one specific embodiment, the first bracket 210 may include a ferrule 211 and a bracket body 212 for mounting the lens 300; and the bracket body 212 is fixedly connected to the ferrule 211. The ferrule 211 is sleeved on the cylindrical component 100 and is rotatable around the cylindrical component 100. Specifically, one of an inner wall of the ferrule 211 and an outer wall of the cylindrical component 100 may be provided with first tooth slots 110, and other one of the inner wall of the ferrule 211 and the outer wall of the cylindrical component 100 may be provided with first engaging tooth 211*a*; and the ferrule 211 is connected to the cylindrical component 100 by the engagement between the first tooth slots 110 and the first engaging tooth 211*a*.

During the adjustment, the operator can drive the first bracket 210 to move by applying a certain force. During the movement of the first bracket 210, the first tooth slots 110 and the first engaging tooth 211*a* move relative to each other. After the adjustment is completed (the external force is removed), the engagement between the first tooth slots 110 and the first engaging tooth 211*a* can ensure that the first bracket 210 is positioned at the adjusted position, and finally the adjustment of the lenses 300 is completed.

In the lens adjustment device of the multi-lens camera disclosed in the embodiment of the present application, the lens brackets 200 mounted with the lenses 300 are engaged with the cylindrical component 100, and then are able to drive the lenses 300 to rotate around cylindrical component 100. The operator can apply a certain force to achieve the relative movement between the first engaging tooth 211*a* and the first tooth slots 110, and then can drive the lens 300 to rotate, thereby achieving the P-direction adjustment of the lenses 300. Compared with the background art, the adjustment operation of the lens 300 mentioned above is simple and the adjustment efficiency is high.

Figure 2:
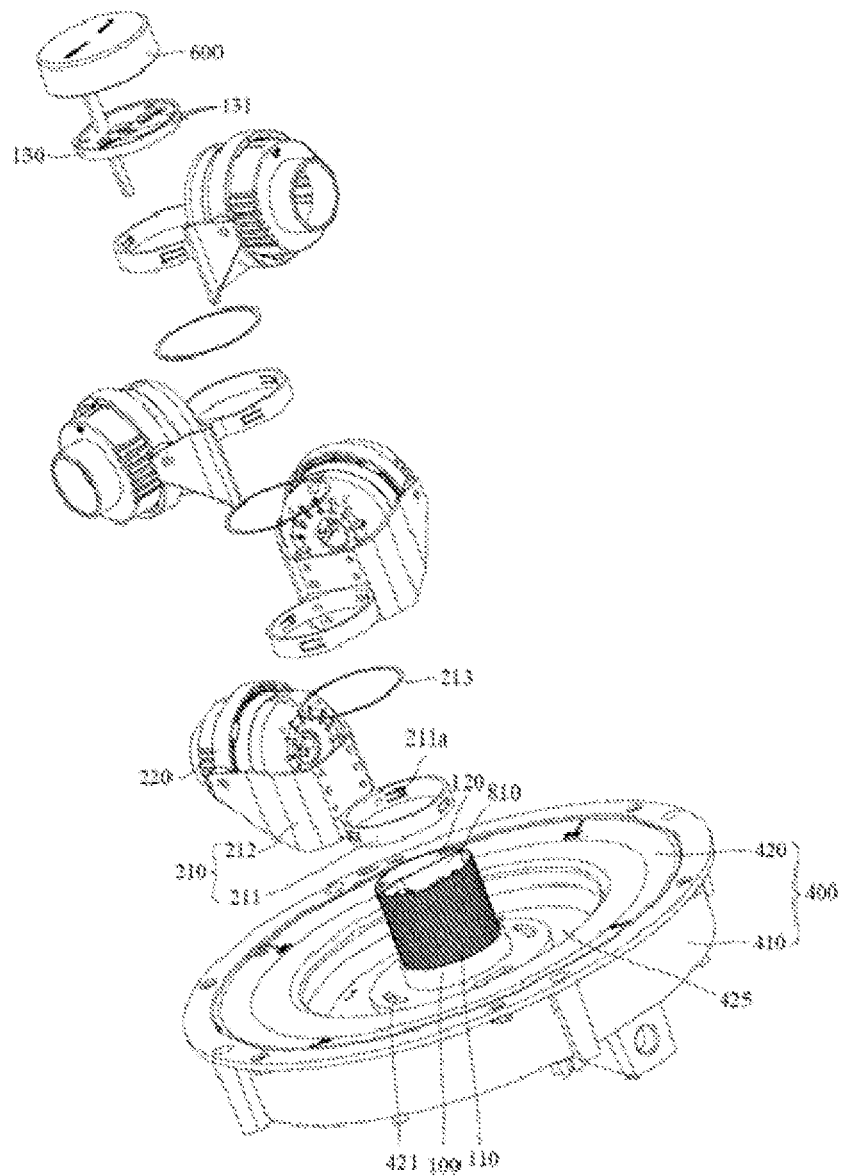
FIG. 2 is a schematic diagram of an exploded structure of a partial structure of a multi-lens camera according to an embodiment of the present application.

The multi-lens camera disclosed in the embodiment of the present application includes at least two lens brackets 200, and ferrules 211 of the at least two lens brackets 200 can be sequentially sleeved on the cylindrical component 100. Generally, lenses 300 of the multi-lens camera are located at the same height. Based on this, the operator can control the height of the engagement between the bracket body 212 and the ferrules 211 to achieve the alignment for the height of the lenses 300 mounted on the bracket body 212, as shown in FIG. 2.

In order to improve the stability and compactness of the mounting between the ferrules 211 and the assembly effect, optionally, a gap-compensating elastic pad 213 may be arranged between two adjacent ferrules 211, and the gap-compensating elastic pad 213 may be sleeved on the cylindrical component 100. The gap-compensating elastic pad 213 can better compensate the gap between two adjacent ferrules 211, and at the same time can make the two adjacent ferrules 211 elastically contact with each other.

In one specific implementation, the outer wall of the cylindrical component 100 may be provided with first tooth slots 110, and accordingly, the inner wall of the ferrule 211 may be provided with first engaging tooth 211a. In order to improve the assembly stability, optionally, there may be a plurality of first engaging teeth 211a and the plurality of first engaging teeth 211a may be dispersedly distributed along the circumferential direction of the inner wall of the ferrule 211.

Figure 3:
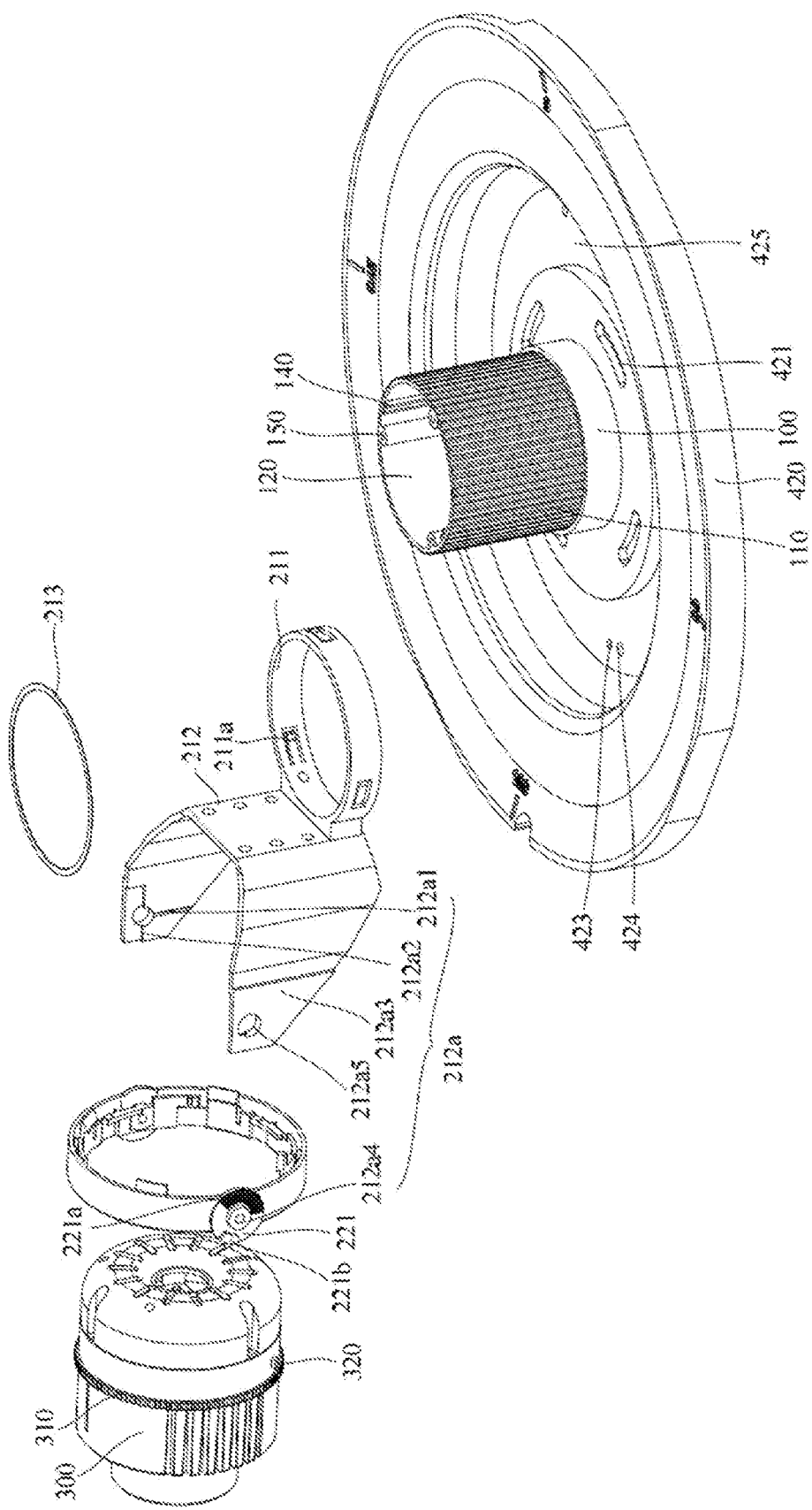
FIG. 3 is a schematic diagram of an exploded structure of a partial structure of a multi-lens camera according to an embodiment of the present application.
Figure 4:
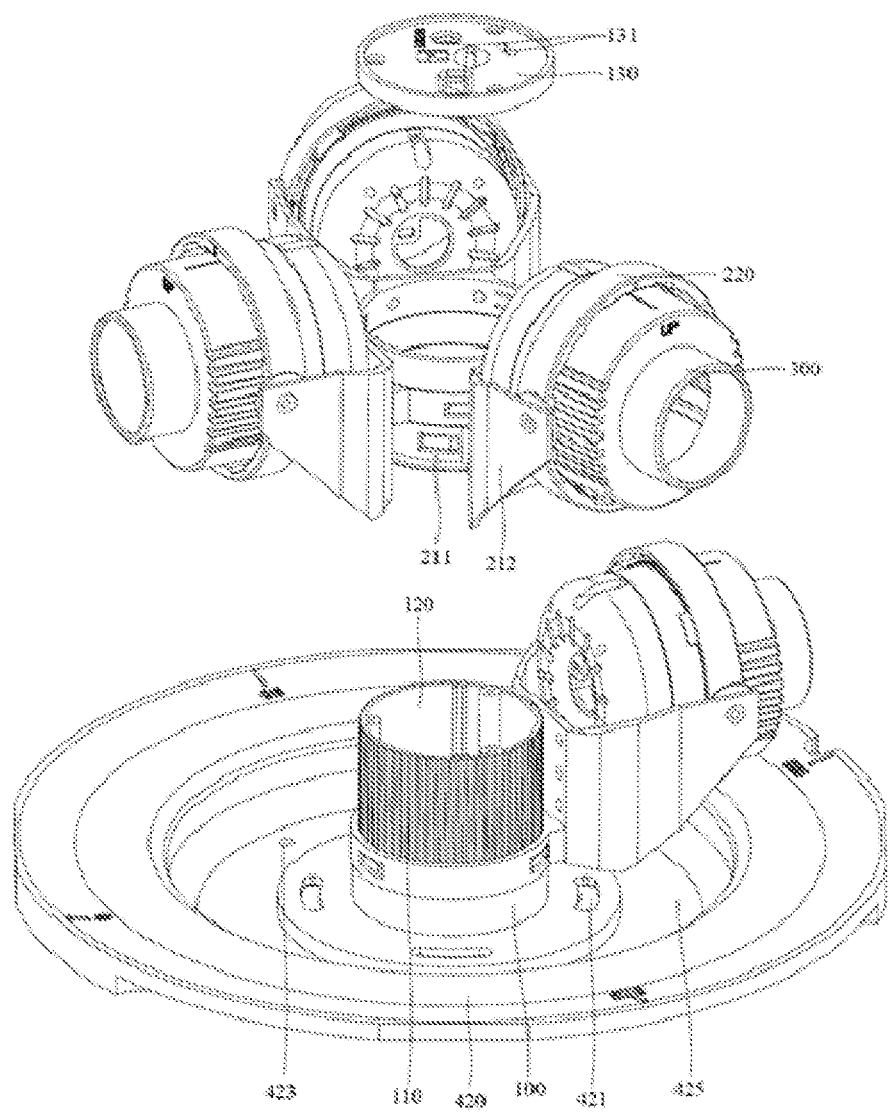
FIG. 4 is a schematic diagram of an exploded structure of a partial structure of a multi-lens camera according to an embodiment of the present application.
Figure 5:
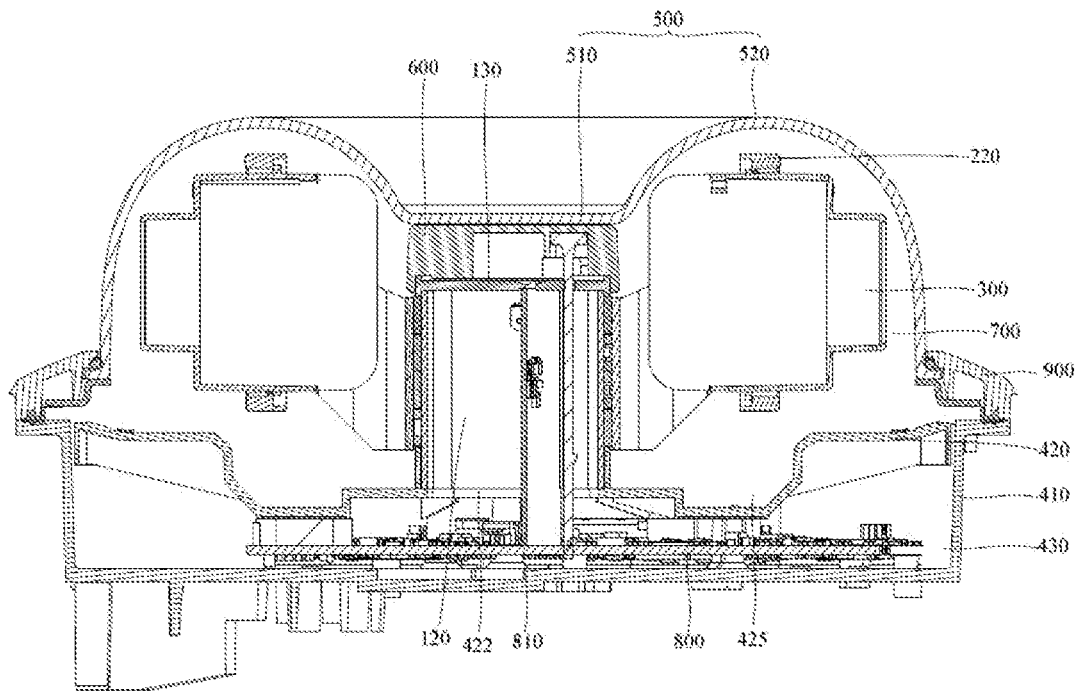
FIG. 5 is a cross-sectional view of a multi-lens camera according to an embodiment of the present application.
Figure 6:
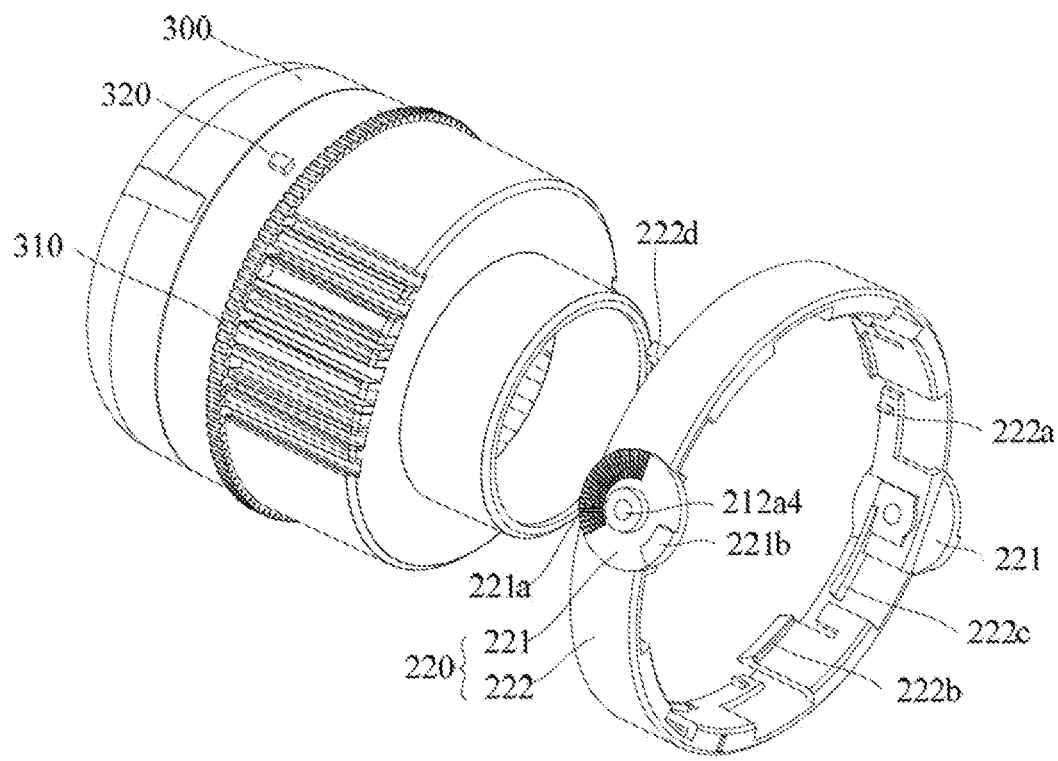
FIG. 6 is a schematic diagram of an exploded structure of a lens and a second bracket according to an embodiment of the present application.
Figure 7:
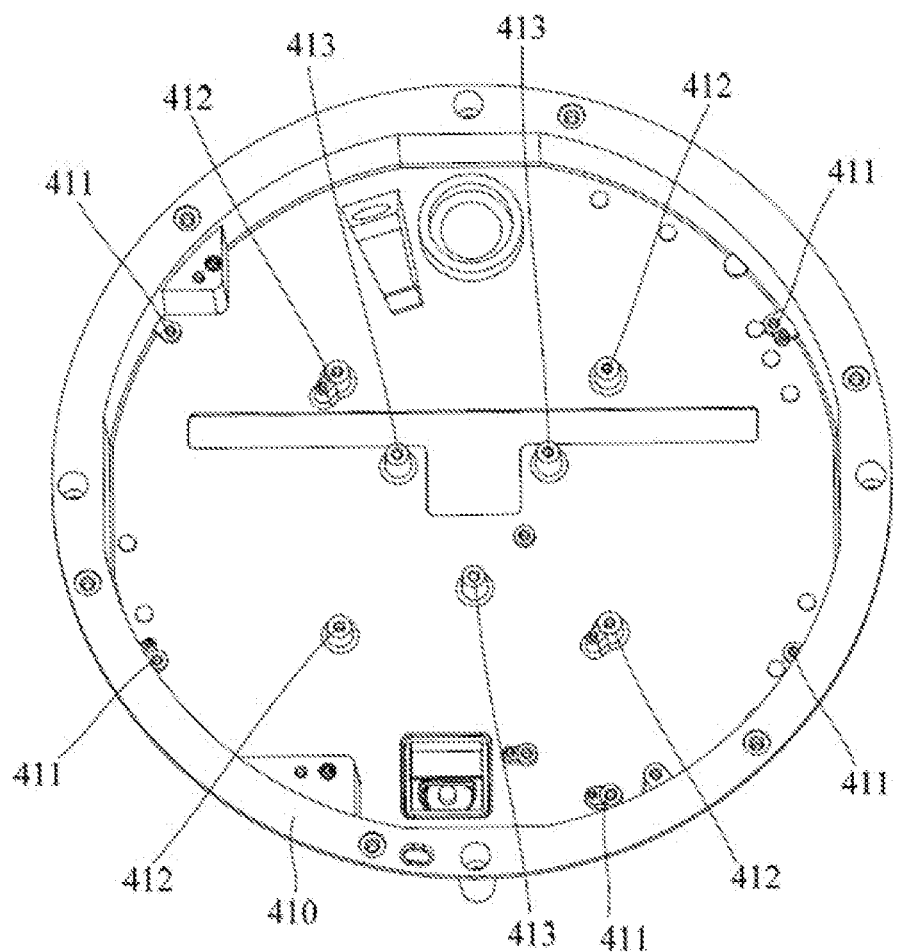
FIG. 7 is a schematic structural diagram of a main housing according to an embodiment of the present application.
Figure 8:
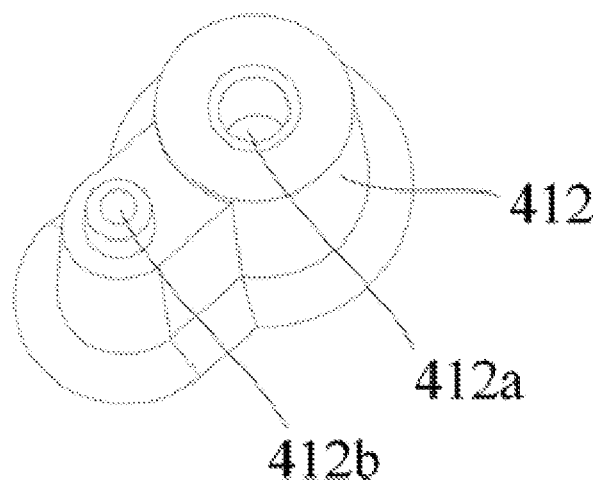
FIG. 8 is a schematic structural diagram of a second support pillar.
Figure 9:
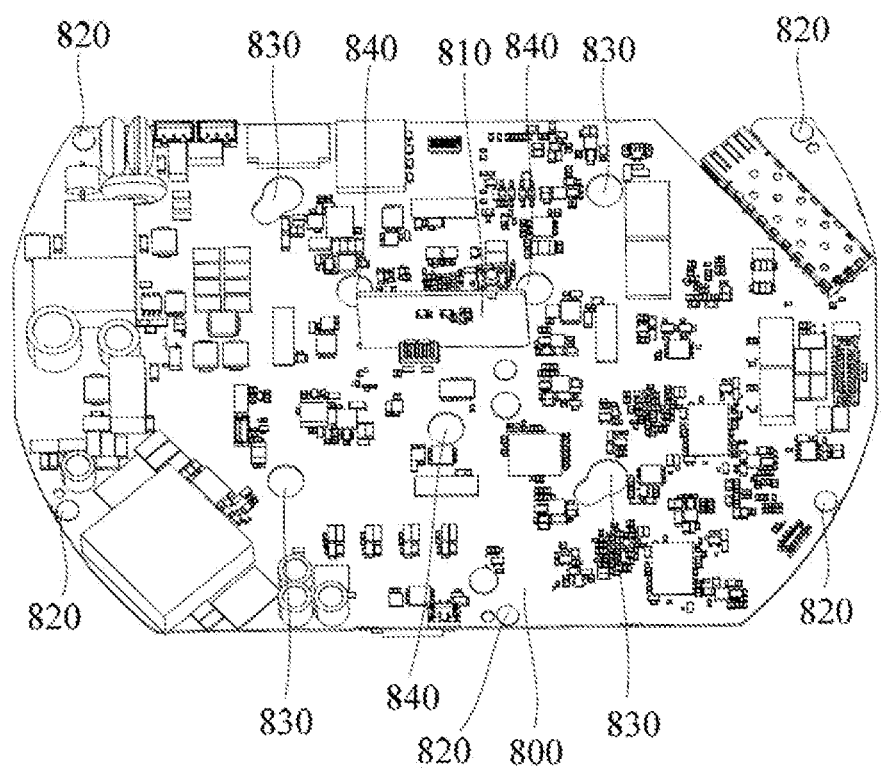
FIG. 9 is a schematic structural diagram of a main board.
Figure 10:
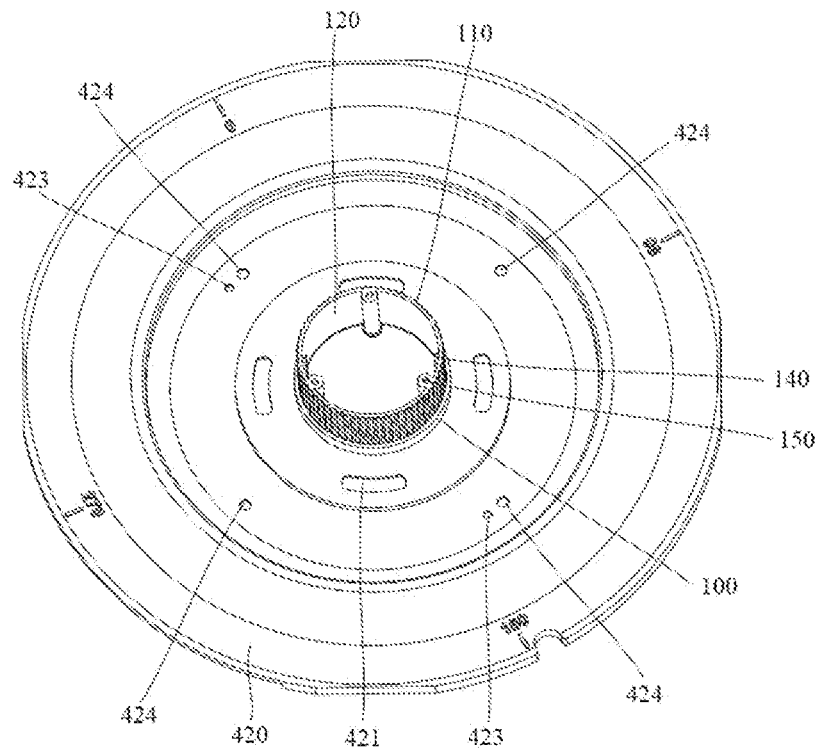
FIG. 10 is a schematic diagram of the assembly structure of an inner baffle and a cylindrical component according to an embodiment of the present application.

Referring to FIGS. 1, 3 and 6, in the lens adjustment device disclosed in the embodiment of the present application, the lens brackets 200 may include a second bracket 220, and the second bracket 220 is arranged on the first bracket 210. The second bracket 220 is used to rotatablely cooperate with a lens 300, and then enable the lens 300 to rotate around its own axis, achieving the adjustment of the lens 300, that is, achieving the R-direction adjustment of the lens 300.

The second bracket 220 may be rotatablely arranged on the first bracket 210, and is able to move in a direction perpendicular to the rotating direction of the first bracket 210, thereby achieving that the second bracket 220 drives the lens 300 to pitching-rotate, and finally achieving that the lens 300 rotates in a direction perpendicular to the rotating direction of the first bracket 210, that is, achieving the T-direction adjustment of the lens 300.

In order to achieve more flexible adjustment, the bracket body 212 may include a support arm 212a rotatablely fitting with the second bracket 220. The second bracket 220 includes a tensioning disc 221 able to be movably engaged with the support arm 212a, the tensioning disc 221 includes a tensioning area. One of the tensioning area and the support arm 212a is provided with a tensioning protrusion 212a1, and other one of the tensioning area and the support arm 212a is provided with a plurality of tensioning slots 221a extending along the radial direction of the tensioning disc 221; and the tensioning slots 221a are engaged with the tensioning protrusion 212a1. In one specific implementation, the tensioning disc 221 is provided with tensioning slots 221a; the support arm 212a is provided with a tensioning protrusion 212a1; the tensioning protrusion 212a1 and the tensioning slots 221a are able to move relative to each other with the rotation of the second bracket 220. Specifically, the engagement between the tensioning slots 221a and the tensioning protrusion 212a1 means that: when the second bracket 220 is not subjected to an external force, the tensioning protrusion 212a1 and the tensioning slots 221a are positioned to ensure that the lens is remained in a certain position; when the second bracket 220 is subjected to an external force, under the action of the external force, the positioning between the tensioning protrusion 212a1 and the tensioning slots 221a can be released due to elastic deformation, thereby enabling the both to rotate relative to each other.

In an actual application process, the lens 300 only needs to rotate relative to the second bracket 220 within a set angle range. Based on this, referring to FIG. 6, the support arm 212a may be provided with a first position-limiting part 212a2, the tensioning disc 221 is provided with a second position-limiting part 221b; and the second position-limiting part 221b is able to cooperate with the first position-limiting part 212a2 in the rotating direction of the tensioning disc 221 in a position-limiting manner.

Referring to FIG. 3, in one specific implementation, a support arm 212a may include a support arm body 212a3 and a fixing block 212a4; the fixing block 212a4 is fixedly connected to the tensioning disc 221; the support arm body 212a3 is provided with a mounting hole 212a5; and the fixing block 212a4 is rotatablely arranged in a mounting hole 212a5. The above solution achieves the rotation of the lens 300 relative to the support arm 212a with the rotational engagement between the fixing block 212a4 and the mounting hole 212a5.

In order to improve the stability of the rotation of the lenses 300, optionally, there may be two support arms 212a; and the two support arms 212a are respectively arranged on both sides of the second bracket 220.

Referring again to FIG. 3 and FIG. 6, the second bracket 220 may include an annular structure member 222; the annular structure member 222 is movably engaged with the lens 300, and then enable the lens 300 to rotate around its own axis. The tensioning disc 221 may arranged on the annular structure member 222.

One of the annular structure member 222 and the lens 300 is provided with second tooth slots 310, and other one of the annular structure member and the lens is provided with second engaging teeth engaged with the second tooth slots; and the second engaging teeth rotate relative to the second tooth slots 310 in the circumferential direction of the lens 300. Specifically, the lens 300 may be provided with second tooth slots 310, and accordingly, the annular structure member 222 may be provided with second engaging teeth 222a.

An inner wall of the annular structure member 222 may be provided with a fastener 222b and a protrusion stop 222c; the protrusion stop 222c is positioned in a set direction and attached to the second tooth slots 310 of the lens 300 or one end of the second engaging teeth 222a, such that the annular structure member 222 cannot move relative to the lens 300 in the set direction; the fastener 222b is engaged to the second tooth slots 310 of the lens 300 or other end of the second engaging teeth 222a, thereby achieving the positioning between the lens 300 and the annular structure member 222 in the axial direction of the annular structure member 222; and specifically, the set direction is the axial direction of lens 300.

Specifically, the protrusion stop 222c may be an elastic arm perpendicular to the inner wall of second bracket 220; the elastic arm abuts against the second tooth slots 310 or one end of the second engaging teeth 222a with tension.

In an actual application process, the lens 300 typically rotates around its own axis within a certain angle range and does not need to rotate around its own axis within the range of 360°. Based on this, referring again to FIG. 3 and FIG. 6, optionally, the annular structure member 222 is provided with a third position-limiting part 222d; the lens 300 may be provided with a fourth position-limiting part 320; and the third position-limiting part 222d is position-limited engaged with the fourth position-limiting part 320 in the rotating direction of lens 300 around its own axis. The position-limited engagement between the third position-limiting part 222d and the fourth position-limiting part 320 enables the lens 300 to rotate only within a required angle range.

Referring again to FIGS. 1-10, the embodiment of the present application discloses a multi-lens camera, which includes lenses 300 and the lens adjustment device mentioned above.

The said multi-lens camera may include a main housing assembly 400 and a transparent cover 500. The main housing assembly 400 typically includes a plurality of components, and the main housing assembly 400 provides the mounting base or accommodating space for the other components of the multi-lens camera. The transparent cover 500 is mounted on the main housing assembly 400, and the lens adjustment device is mounted within a space formed by the transparent cover 500 and the main housing assembly 400. The transparent cover 500 is typically fixed on the main housing assembly 400 in a fixed manner, the edge of the transparent cover 500 is typically pressed and fixed on the edge of the main housing 410 mention below by means of a pressing ring 900; and the pressing ring 900 may be fixedly connected to the main housing 410 by thread connectors. The transparent cover 500 includes a flat portion 510 and a curved portion 520 surrounding the flat portion 510. In one specific implementation, the flat portion 510 is located at the center of the transparent cover 500, and the curved portion 520 is distributed around the flat portion 510. The lens 300 is arranged within a lens accommodating space 700 formed by the curved portion 520 and the main housing assembly 400.

In the multi-lens camera disclosed in the embodiment of the present application, the main housing assembly 400 may include a main housing 410 and an inner baffle 420 arranged at the top opening of the main housing 410; the inner baffle 420 and the main housing 410 may constitute a main board cavity 430; the main board 800 may be arranged in the main board cavity 430; the area of the main board 800 is less than that of the main board cavity 430, thereby ensuring that the main board 800 can be mounted within the main board cavity 430. The cylindrical component 100 is fixed on the inner baffle 420; the inner baffle 420 may be provided with cable holes 421; and the lens 300 is electrically connected with the main board 800 by means of cables passing through the cable holes 421, which can reduce the travelling length of the cables and facilitate the electrical connection. Specifically, the inner baffle 420 may be fixedly connected to the cylindrical component 100 by thread connectors. In the present application, the lenses 300 are mounted on the lens adjustment device, and the overall area occupied by the lens and the lens adjustment device is less than that of the support region of the inner baffle 420, thereby enabling that the whole of the lenses 300 and the lens adjustment device is located in the support region of the inner baffle 420 and also facilitating the covering of the transparent cover 500.

There may be a plurality of cable holes 421, which may be uniformly distributed along a sliding direction of the lenses 300 around the cylindrical component 100. In order to better adapt to the influence by the rotation, specifically, each of the cable holes may be an arc-shaped strip hole.

In an optional solution, the inner baffle 420 may be provided with an avoidance hole 422; the avoidance hole 422 is docked with one end port of the cylindrical component 100; other end port of the cylindrical component 100 is provided with a cap 130; the main board 800 includes an external interface board 810; the external interface board 810 passes through the avoidance hole 422 from the main board 800 into a cylindrical cavity 120 of the cylindrical component 100; and the cap 130 is provided with an interface 131 for connecting the external interface board 810. In the above solution, the cylindrical cavity 120 of the cylindrical component 100 can be fully utilized to accommodate an external interface board 810 used for external connection, and at the same time, the interface 131 facilitates the access of external devices.

The cylindrical component 100 is fixedly connected to the inner baffle 420, thereby achieving the assembly of the lens adjustment device and the main housing assembly 400. Specifically, the cylindrical component 100 may be fixedly connected to the inner baffle 420 by soldering or by thread connectors.

In order to achieve better assembly and at the same time improve the assembly compactness, optionally, the inner baffle 420 may be a disc-shaped member and have a recess 425 coaxially arranged therewith; the cylindrical component 100 is arranged at the center of the inner baffle 420. One end of the cylindrical component 100 is fixed in the recess 425, and other end extends out of the top opening of the recess 425. The lenses 300 are arranged outside the top opening so as not to affect the imaging function of the lenses 300. The above-mentioned assembly manner can make the cylindrical component 100 partially occupy the area of the recess 425 that is recessed into the accommodating cavity 430, and thus can reduce the overall height after assembly, that is, the axial dimension of the cylindrical component 100.

In one specific implementation, the inner baffle 420 may be a stamped metal part, which has the advantages of simple preparation and high structural strength.

In order to improve the assembly stability of an external interface board 810, optionally, the inner wall of the cylindrical component 100 is provided with a snap slot 140, and the external interface board 810 may be fastened to the snap slot 140.

The inner wall of the cylindrical component 100 may be provided with a connecting pillar 150, and the connecting pillar 150 may be provided with a connecting hole, and the cylindrical component 100 may be fixedly connected to the inner baffle 420 by a connector passing through the connecting hole and the inner baffle 420. The connector may be a thread connector. Optionally, the connector may in turn pass through the cap 130, the connecting hole of the connecting pillar 150 and the inner baffle 420, thereby achieving the fixed connection of the three. This assembly method has a simple structure and convenient operation.

In an optional solution, an elastic pad 600 is arranged between the cap 130 and the flat portion 510, and the elastic pad 600 contacts elastically with the cap 130 and the flat portion 510. In this case, the cylindrical component 100 can support the flat portion 510 by the elastic pad 600, and thus can improve the resistance to the deformation of transparent cover 500.

The bottom of the main housing 410 may be provided with at least two first support pillars 411 dispersedly arranged, and the first support pillars 411 are supported between the main board 800 and the bottom wall of the main housing 410 and are fixedly connected to the main board 800. Specifically, the main board 800 is provided with first connecting holes 820; the first support pillars 411 are arranged opposite to the connecting holes 820; and the main board 800 may be fixedly connected to the thread holes on the first support pillars 411 by thread connectors passing through the first connecting holes 820.

The bottom wall of the main housing 410 may be provided with at least two second support pillars 412 dispersedly arranged; the main board 800 may be provided with first perforations 830; each of the second support pillars 412 passes through the first perforation 830 of the main board 800 and is supported between the inner baffle 420 and the bottom wall of the main housing 410; and the inner baffle 420 is fixedly connected to the second support pillars 412. Specifically, each of the second support pillar 412 is provided with a thread hole 412*a*; the inner baffle 420 may be provided with second connecting holes 424, the inner baffle 420 may be fixedly connected to the second support pillar by thread connectors passing through the second connecting holes 424 and the first perforations 830. Specifically, the thread connectors are fixedly connected to the thread holes 412*a* of the second support pillars 412.

In an optional solution, the top of each of the second support pillars 412 may be provided with a positioning protrusion 412*b*; the inner baffle 420 may be provided with positioning holes 423; and the positioning protrusions 412*b* are positioned and engaged with the positioning holes 423. During the installation process, the operator may make the positioning holes 423 position and engage with the position protrusions 412*b*, and thus can determine whether the inner baffle 420 is mounted in place. Specifically, at least two second support pillars 412 may be provided with the positioning protrusions 412*b* to achieve the overall positioning of the inner baffle 420.

The bottom wall of the main housing 410 may be provided with at least two third support pillars 413 dispersedly arranged, and the third support pillars 413 pass through the main board 800 and are supported at the bottom end of the cylindrical component 100. Furthermore, the cylindrical component 100 is strongly supported. Specifically, the main board 800 may be provided with second perforations 840, and each of the third support pillars 413 is supported at the bottom end of the cylindrical component 100 after passing through the second perforation 840.

The arrangement of the first support pillars 411, the second support pillars 412, and the third support pillars 413 can improve the support of the corresponding portions. And when the transparent cover 500 of the multi-lens camera is impacted by pressure, the deformation of the corresponding components in the multi-lens camera can be avoided, so the multi-lens camera has a more excellent anti-explosion performance.

Referring to FIGS. 1-10, the present application discloses a multi-lens camera, which may include a lens adjustment device, a main housing assembly 400, a transparent cover 500, and lenses 300.

The main housing assembly 400 typically includes a plurality of components, and the main housing assembly 400 provides the mounting base or accommodating space for the other components of the multi-lens camera. The transparent cover 500 is mounted on the main housing assembly 400, and the lens adjustment device is mounted within a space formed by the transparent cover 500 and the main housing assembly 400. The transparent cover 500 is typically fixed on the main housing assembly 400 in a fixed manner, the edge of the transparent cover 500 is typically pressed on the edge of the main housing 410 mention below by means of a pressing ring 900; and the pressing ring 900 may be fixedly connected to the main housing 410 by thread connectors. The transparent cover 500 includes a flat portion 510 and a curved portion 520 surrounding the flat portion 510. In one specific implementation, the flat portion 510 is located at the center of the transparent cover 500, and the curved portion 520 is distributed around the flat portion 510. The lens 300 is arranged within a lens accommodating space 700 formed by the curved portion 520 and the main housing assembly 400.

The disclosed lens adjustment device includes a cylindrical component 100 and at least two lens brackets 200; the cylindrical component 100 provides the mounting base for the lens brackets 200 and lenses 300; the lenses 300 are arranged on the cylindrical component 100 by means of the brackets 200. The cylindrical component 100 is fixedly connected to the main housing assembly 400 of the multi-lens camera.

The lens brackets 200 are connected with the cylindrical component 100 and are able to drive lenses 300 to rotate around the cylindrical component 100. The engagement between the brackets 200 and the cylindrical component 100 is an tension fit, that is, the brackets 200 need an external force (a driving force mentioned below) to rotate around the cylindrical component 100, and thus driving the lenses 300 to rotate.

Specifically, the lens brackets 200 may engage with the cylindrical component 100, and drive the lenses 300 to rotate around the cylindrical component 100, so that the lens 300 can rotate in a plane perpendicular to the axis of the cylindrical component 100, so as to achieve the P-direction adjustment of lenses 300. During the adjustment, the engagement between the lens brackets 200 and the cylindrical component 100 is a tension fit, and the operator can drive the lens brackets 200 to rotate around the cylindrical component 100 by applying a certain driving force, thereby achieving the rotation of the lenses 300 around the cylindrical component 100.

In the multi-lens camera disclosed in the embodiment of the present application, the cylindrical component 100 of the lens adjustment device is fixed on the main housing assembly 400; the lens brackets 200 mounted with the lenses 300 are engaged with the cylindrical component 100, which can drive the lenses 300 to rotate around the cylindrical component 100. The operator can drive the lenses 300 to rotate by applying a certain driving force, thereby achieving the P-direction adjustment of lenses 300. Compared with the background art, the adjustment operation of the lens 300 mentioned above is simple and the adjustment efficiency is high.

Specifically, the engagement between the lens brackets 200 and the cylindrical component 100 means that: when the lens brackets 200 are subjected to an external force, they can be in an engaging and positioning state, so as to ensure the lenses 300 mounted on the lens brackets 200 are remained in the current position; when the lens brackets 200 are subjected to an external force, the lens brackets 200 can rotate around the cylindrical component 100, and thereby driving the lenses 300 to rotate.

In the multi-lens camera disclosed in the embodiment of the present application, the transparent cover 500 may include a flat portion 510 and a curved portion 520 surrounding the flat portion 510, and the curved portion 520 can improve the resistance to deformation of the whole transparent cover 500 and thus improve the anti-explosion performance of the multi-lens camera.

The lens brackets 200 may include a first bracket 210; a lens 300 may be mounted on the first bracket 210, the first bracket 210 may be engaged with the cylindrical component 100 and drive the lens 300 to rotate around the cylindrical component 100.

There are a plurality of assembly manners for the rotation of the first bracket 210 around the cylindrical component 100. In one specific embodiment, the first bracket 210 may include a ferrule 211 and a bracket body 212 for mounting the lens 300; and the bracket body 212 is fixedly connected to the ferrule 211. The ferrule 211 is sleeved on the cylindrical component 100 and is rotatable around the cylindrical component 100. Specifically, one of an inner wall of the ferrule 211 and an outer wall of the cylindrical component 100 may be provided with first tooth slots 110, and other one of the inner wall of the ferrule 211 and the outer wall of the cylindrical component 100 may be provided with first engaging tooth 211a; and the ferrule 211 is connected to the cylindrical component 100 by the engagement between the first tooth slots 110 and the first engaging tooth 211a. Optionally, the first tooth slots 110 are arranged on the outer wall of the cylindrical component 100, and the first engaging tooth 211a are arranged on the inner wall of the ferrule 211. Of course, the first tooth slots 110 may be also arranged on the inner wall of the ferrule 211, and the first engaging tooth 211a are arranged on the outer wall of the cylindrical component 100.

During the adjustment, the operator can drive the first bracket 210 to move by applying a certain force. During the movement of the first bracket 210, the first tooth slots 110 and the first engaging tooth 211a move relative to each other. After the adjustment is completed (the external force is removed), the engagement between the first tooth slots 110 and the first engaging tooth 211a can ensure that the first bracket 210 is positioned at the adjusted position, and finally the adjustment of the lenses 300 is completed.

The multi-lens camera disclosed in the embodiment of the present application includes at least two lens brackets 200, and ferrules 211 of the at least two lens brackets 200 can be sequentially sleeved on the cylindrical component 100. Generally, the lenses 300 of the multi-lens camera are located at the same height. Based on this, the operator can control the height of the engagement between the bracket body 212 and the ferrules 211 to achieve the alignment for the height of the lenses 300 mounted on the bracket bodies 212, as shown in FIG. 2.

In order to improve the stability and compactness of the mounting between the ferrules 211 and the assembly effect, in one optional solution, a gap-compensating elastic pad 213 may be arranged between two adjacent ferrules 211, and the gap-compensating elastic pad 213 may be sleeved on the cylindrical component 100. The gap-compensating elastic pad 213 can better compensate the gap between two adjacent ferrules 211, and at the same time can make the two adjacent ferrules 211 elastically contact with each other.

In one specific implementation, the outer wall of the cylindrical component 100 may be provided with first tooth slots 110, and accordingly, the inner wall of the ferrule 211 may be provided with first engaging tooth 211a. In order to improve the assembly stability, optionally, there may be a plurality of first engaging tooth 211a and the plurality of first engaging tooth 211a may be dispersedly distributed along the circumferential direction of the inner wall of the ferrule 211.

Referring to FIGS. 1, 3 and 6, in the lens adjustment device disclosed in the embodiment of the present application, each of the lens brackets 200 may include a second bracket 220, and the second bracket 220 is arranged on the first bracket 210. The second bracket 220 is used to rotatablely cooperate with a lens 300, and then enable the lens 300 to rotate around its own axis, achieving the adjustment of the lens 300, that is, achieving the R-direction adjustment of the lens 300.

The second bracket 220 may be rotatably arranged on the first bracket 210, and is able to move in a direction perpendicular to the rotating direction of the first bracket 210, thereby achieving that the second bracket 220 drives the lens 300 to pitching-rotate, and finally achieving that the lens 300 rotates in a direction perpendicular to the rotating direction of the first bracket 210, that is, achieving the T-direction adjustment of the lens 300.

In order to achieve more flexible adjustment, the bracket body 212 may include a support arm 212a rotatablely fitting with the second bracket 220. The second bracket 220 includes a tensioning disc 221 able to be movably engaged with the support arm 212a, the tensioning disc 221 includes a tensioning area. One of the tensioning area and the support arm 212a is provided with a tensioning protrusion 212a1, and other one of the tensioning area and the support arm 212a is provided with a plurality of tensioning slots 221a extending along the radial direction of the tensioning disc 221; and the tensioning slots 221a are engaged with the tensioning protrusion 212a1. In one specific implementation, the tensioning disc 221 is provided with tensioning slots 221a; the support arm is provided with a tensioning protrusion 212a1; the tensioning protrusion 212a1 and the tensioning slots 221a are able to move relative to each other with the rotation of the second bracket 220. Specifically, the engagement between the tensioning slots 221a and the tensioning protrusion 212a1 means that: when the second bracket 220 is not subjected to an external force, the tensioning protrusion 212a1 and the tensioning slots 221a are positioned to ensure that the lens is remained in a certain position; when the second bracket 220 is subjected to an external force, under the action of the external force, the positioning between the tensioning protrusion 212a1 and the tensioning slots 221a can be released due to elastic deformation, thereby enabling the both to rotate relative to each other.

In an actual application process, the lens 300 only needs to rotate relative to the second bracket 220 within a set angle range. Based on this, referring to FIG. 6, the support arm 212a may be provided with a first position-limiting part 212a2; the tensioning disc 221 is provided with a second position-limiting part 221b; and the second position-limiting part 221b is able to cooperate with the first position-limiting part 212a2 in the rotating direction of the tensioning disc 221 in a position-limiting manner.

Referring to FIG. 3, in one specific implementation, a support arm 212a may include a support arm body 212a3 and a fixing block 212a4; the fixing block 212a4 is fixedly connected to the tensioning disc 221; the support arm body 212a3 is provided with a mounting hole 212a5; and the fixing block 212a4 is rotatablely arranged in a mounting hole 212a5. The above solution achieves the rotation of the lens 300 relative to the support arm 212a with the rotational engagement between the fixing block 212a4 and the mounting hole 212a5.

In order to improve the stability of the rotation of the lenses 300, optionally, there may be two support arms 212a; and the two support arms 212a are respectively arranged on both sides of the second bracket 220.

Referring again to FIG. 3 and FIG. 6, the second bracket 220 may include an annular structure member 222; the annular structure member 222 is movably engaged with the lens 300, and then enable the lens 300 to rotate around its own axis. The tensioning disc 221 may arranged on the annular structure member 222.

One of the annular structure member 222 and the lens 300 is provided with second tooth slots 310, and other one of the annular structure member and the lens is provided with second engaging teeth engaged with the second tooth slots; and the second engaging teeth rotate relative to the second tooth slots 310 in the circumferential direction of the lens 300. Specifically, the lens 300 may be provided with second tooth slots 310, and accordingly, the annular structure member 222 may be provided with second engaging teeth 222a. Of course, the second engaging teeth 222a may be arranged on the lens, and the second tooth slots 310 are arranged on the annular structure member 222.

An inner wall of the annular structure member 222 may be provided with a fastener 222b and a protrusion stop 222c; the protrusion stop 222c is positioned in a set direction and attached to the second tooth slots 310 of the lens 300 or one end of the second engaging teeth 222a, thereby such that the annular structure member 222 cannot move relative to the lens 300 in the set direction; the fastener 222b is engaged to the second tooth slots 310 on the lens 300 or other end of the second engaging teeth 222a, thereby achieving the positioning between the lens 300 and the annular structure member 222 in the axial direction of the annular structure member 222; and specifically, the set direction is the axial direction of lens 300.

Specifically, the protrusion stops 222c may be an elastic arm perpendicular to the inner wall of second bracket 220; the elastic arm abuts against the second tooth slots 310 or one end of the second engaging teeth 222a with tension.

In an actual application process, the lens 300 typically rotates around its own axis within a certain angle range and does not need to rotate around its own axis within the range of 360°. Based on this, referring again to FIG. 3 and FIG. 6, optionally, the annular structure member 222 is provided with a third position-limiting part 222d; the lens 300 may be provided with a fourth position-limiting part 320; and the third position-limiting part 222d is position-limited engaged with the fourth position-limiting part 320 in the rotating direction of lens 300 around its own axis. The position-limited engagement between the third position-limiting part 222d and the fourth position-limiting part 320 enables the lens 300 to rotate only within a required angle range.

In the multi-lens camera disclosed in the embodiment of the present application, the main housing assembly 400 may include a main housing 410 and an inner baffle 420 arranged at the top opening of the main housing 410; the inner baffle 420 and the main housing 410 may constitute a main board cavity 430; a main board cavity 430 may be provided with a main board 800; the area of the main board 800 is less than that of the main board cavity 430, thereby ensuring that the main board 800 can be mounted within the main board cavity 430. The cylindrical component 100 is fixed on the inner baffle 420; the inner baffle 420 may be provided with cable holes 421; and the lens 300 is electrically connected with the main board 800 by means of cables passing through the cable holes 421, which can reduce the travelling length of the cables and facilitate the electrical connection. Specifically, the inner baffle 420 may be fixedly connected to the cylindrical component 100 by thread connectors. In the present application, the lenses 300 are mounted on the adjuster, and the overall area occupied by the two is less than that of the support region of the inner baffle 420, thereby enabling that the whole of the lenses 300 and the lens adjustment device is located in the support region of the inner baffle 420 and also facilitating the covering of the transparent cover 500.

There may be a plurality of cable holes 421, which may be uniformly distributed along a sliding direction of the lenses around the cylindrical component 100. In order to better adapt to the influence by the rotation, specifically, each of the cable holes may be an arc-shaped strip hole.

In an optional solution, the inner baffle 420 may be provided with an avoidance hole 422; the avoidance hole 422 is docked with one end port of the cylindrical component 100; other end port of the cylindrical component 100 is provided with a cap 130; the main board 800 includes an external interface board 810; the external interface board 810 passes through the avoidance hole 422 from the main board 800 into a cylindrical cavity 120 of the cylindrical component 100; and the cap 130 is provided with an interface 131 for connecting the external interface board 810. In the above solution, the cylindrical cavity 120 of the cylindrical component 100 can be fully utilized to accommodate an external interface board 810 used for external connection, and at the same time, the interface 131 facilitates the access of external devices.

The cylindrical component 100 is fixedly connected to the inner baffle 420, thereby achieving the assembly of the lens adjustment device and the main housing assembly 400. Specifically, the cylindrical component 100 may be fixedly connected to the inner baffle 420 by soldering or by thread connectors.

In order to achieve better assembly and at the same time improve the assembly compactness, optionally, the inner baffle 420 may be a disc-shaped member and have a recess 425 coaxially arranged therewith; the cylindrical component 100 is arranged at the center of the inner baffle 420. One end of the cylindrical component 100 is fixed in the recess 425, and other end extends out of the top opening of the recess 425. The lenses 300 are arranged outside the top opening so as not to affect the imaging function of the lenses 300. The above-mentioned assembly manner can make the cylindrical component 100 partially occupy the area of the recess 425 that is recessed into the accommodating cavity 430, and thus can reduce the overall height after assembly, that is, the axial dimension of the cylindrical component 100.

In one specific implementation, the inner baffle 420 may be a stamped metal part, which has the advantages of simple preparation and high structural strength.

In order to improve the assembly stability of an external interface board 810, optionally, the inner wall of the cylindrical component 100 is provided with a snap slot 140, and the external interface board 810 may be fastened to the snap slot 140.

The inner wall of the cylindrical component 100 may be provided with a connecting pillar 150, and the connecting pillar 150 may be provided with a connecting hole, and the cylindrical component 100 may be fixedly connected to the inner baffle 420 by a connector passing through the connecting hole and the inner baffle 420. The connector may be a thread connector. Optionally, the connector may in turn pass through the cap 130, the connecting hole of the connecting pillar 150 and the inner baffle 420, thereby achieving the fixed connection of the three. This assembly method has a simple structure and convenient operation.

In an optional solution, an elastic pad 600 is arranged between the cap 130 and the flat portion 510, and the elastic pad 600 contacts elastically with the cap 130 and the flat portion 510. In this case, the cylindrical component 100 can support the flat portion 510 by the elastic pad 600, and thus can improve the resistance to the deformation of transparent cover 500.

The bottom of the main housing 410 may be provided with at least two first support pillars 411 dispersedly arranged, and the first support pillars 411 are supported between the main board 800 and the bottom wall of the main housing 410 and are fixedly connected to the main board 800. Specifically, the main board 800 is provided with first connecting holes 820; the first support pillars 411 are arranged opposite to the connecting holes 820; and the main board 800 may be fixedly connected to the thread holes on the first support pillars 411 by thread connectors passing through the first connecting holes 820.

The bottom wall of the main housing 410 may be provided with at least two second support pillars 412 dispersedly arranged; the main board 800 may be provided with first perforations 830; each of the second support pillars 412 passes through the first perforation 830 of the main board 800 and is supported between the inner baffle 420 and the bottom wall of the main housing 410; and the inner baffle 420 is fixedly connected to the second support pillars 412. Specifically, each of the second support pillar 412 is provided with a thread hole 412a; the inner baffle 420 may be provided with second connecting holes 424, the inner baffle 420 may be fixedly connected to the second support pillar by thread connectors passing through the second connecting holes 424 and the first perforations 830. Specifically, the thread connectors are fixedly connected to the thread holes 412a of the second support pillars 412.

In an optional solution, the top of each of the support pillars may be provided with a positioning protrusion 412b; the inner baffle 420 may be provided with positioning holes 423; and the positioning protrusions 412b are position-limited engaged with the positioning holes 423. During the mounting, the operator may engage the positioning holes with the position protrusions in a position-limited manner, and thus can determine whether the inner baffle 420 is mounted in place. Specifically, it will achieve the overall positioning of the inner baffle 420 with at least two second support pillars 412 provided with positioning protrusions 412b.

The bottom wall of the main housing 410 may be provided with at least two third support pillars 413 dispersedly arranged, and the third support pillars 413 pass through the main board 800 and are supported at the bottom end of the cylindrical component 100. Furthermore, the cylindrical component 100 is strongly supported. Specifically, the main board 800 may be provided with second perforations 840, and each of the third support pillars 413 is supported at the bottom end of the cylindrical component 100 after passing through the second perforation 840.

The arrangement of the first support pillars 411, the second support pillars 412, and the third support pillars 413 can improve the support of the corresponding portions. And when the transparent cover 500 of the multi-lens camera is impacted by pressure, the deformation of the corresponding components in the multi-lens camera can be avoided, so the multi-lens camera has a more excellent anti-explosion performance.

Herein, as long as there is no contradiction, the technical features in each optional solution can be combined to form solutions, and these solutions are within the scope of the disclosure of the present application.

Herein, each alternative only focuses on the difference from other alternatives. As long as there is no conflict, each alternative can be combined arbitrarily. The combined embodiments are also within the scope of the disclosure of the present application. In consideration of the simplicity of the text, the embodiments formed by the combination will not be described separately.

The embodiments described above are simply preferable embodiments of the present application and are not intended to limit the present application. Any modifications, alternatives, improvements, or the like within the spirit and principle of the present application shall be included within the scope of protection of the present application.

The invention claimed is:

1. A multi-lens camera, comprising: lenses (300) and a lens adjustment device, wherein the lenses (300) are mounted on the lens adjustment device and the lens adjustment device comprises a cylindrical component (100) and at least two lens brackets (200), wherein the lens brackets (200) comprises a first bracket (210), the first bracket (210) comprises a ferrule (211) and a bracket body (212) for mounting a lens (300), the bracket body (212) is fixedly connected to the ferrule (211), and the ferrule (211) is sleeved on the cylindrical component (100) and is rotatable around the cylindrical component (100), wherein the multi-lens camera comprises a main housing assembly (400) and a transparent cover (500); the transparent cover (500) comprises a flat portion (510) and a curved portion (520) surrounding the flat portion (510); and the cylindrical component (100), the curved portion (520) and the main housing assembly (400) constitute a lens accommodating space (700) within which the lenses (300) are located.

2. The multi-lens camera of claim 1, wherein the lens adjustment device is mounted on the main housing assembly (400); one end of the cylindrical component (100) is fixed on the main housing assembly (400), and the other end of the cylindrical component contacts with and is supported by the flat portion (510).

3. The multi-lens camera of claim 2, wherein the other end of the cylindrical component (100) is provided with an elastic pad (600), and the elastic pad (600) is supported between the other end of the cylindrical component (100) and the flat portion (510).

4. The multi-lens camera of claim 2, wherein the main housing assembly (400) comprises a main housing (410) and an inner baffle (420) arranged at a top opening of the main housing (410); the inner baffle (420) and the main housing (410) constitute a main board cavity (430), a main board (800) is arranged in the main board cavity (430), an area of the main board (800) is less than that of the main board cavity (430); the lenses (300) are mounted on the lens adjustment device, and an overall area of the lenses and the lens adjustment device is within an area of a support region of the inner baffle (420).

5. The multi-lens camera of claim 4, wherein the inner baffle (420) is a disc-shaped member and has a recess (425) arranged coaxially therewith; the cylindrical component (100) is arranged at the center of the inner baffle (420); one end of the cylindrical component (100) is fixed in the recess (425), and the other end extends out of an top opening of the recess (425); and lenses (300) are arranged outside the top opening of the recess (425).

6. The multi-lens camera of claim 1, wherein one of an inner wall of the ferrule (211) and an outer wall of the cylindrical component (100) is provided with first tooth slots (110), and other one of the inner wall of the ferrule and the outer wall of the cylindrical component is provided with a first engaging tooth (211a); and the ferrule (211) engages with the cylindrical component (100) by the first tooth slots (110) and the first engaging tooth (211*a*).

7. The multi-lens camera of claim 6, wherein ferrules (211) of the at least two lens brackets (200) are sequentially sleeved on the cylindrical component (100).

8. The multi-lens camera of claim 7, wherein a gap-compensating elastic pad (213) is arranged between two adjacent ferrules (211), and the gap-compensating elastic pad (213) is sleeved on the cylindrical component (100).

9. The multi-lens camera of claim 1, wherein a second bracket (220) is arranged on the bracket body (212), and the second bracket (220) is used to rotatablely cooperate with the lens (300) such that the lens (300) rotates around its own axis.

10. The multi-lens camera of claim 9, wherein the second bracket (220) is rotatablely arranged on the first bracket (210), and rotates in a direction perpendicular to a rotating direction of the first bracket (210).

11. A multi-lens camera, comprising: a main housing assembly (400), lenses (300), and a lens adjustment device; the main housing assembly (400) comprises a main housing (410) and an inner baffle (420) arranged at a top opening of the main housing (410); the inner baffle (420) and the main housing (410) constitute a main board cavity (430), a main board (800) is arranged in the main board cavity (430), an area of the main board (800) is less than that of the main board cavity (430), the lenses (300) are mounted on the lens adjustment device, and an overall area of the lenses (300) and the lens adjustment device is within an area of a support region of the inner baffle (420); the lens adjustment device comprises a cylindrical component (100) and at least two lens brackets (200), the lenses (300) are mounted on the lens brackets (200); the lens brackets (200) are connected with the cylindrical component (100) and are able to drive the lenses (300) to rotate around the cylindrical component (100), wherein the cylindrical component (100) is fixed on the inner baffle (420), the inner baffle (420) is provided with a cable hole (421), and the lenses (300) are electrically connected with the main board (800) by means of cables passing through the cable hole (421).

12. The multi-lens camera of claim 11, wherein the lens bracket (200) comprises a first bracket (210), the lens (300) is mounted on the first bracket (210), the first bracket (210) is engaged with the cylindrical component (100) and is able to drive the lens (300) to rotate around the cylindrical component (100).

13. The multi-lens camera of claim 11, wherein there are a plurality of cable holes (421), which are uniformly distributed along a sliding direction of the lens (300) around the cylindrical component (100).

14. The multi-lens camera of claim 13, wherein each of the cable holes (421) is an arc-shaped strip hole.

15. The multi-lens camera of claim 11, wherein the cylindrical component (100) is a central cylindrical column, and the inner baffle (420) is provided with an avoidance hole (422); the avoidance hole (422) is docked with one end port of the cylindrical component (100), the other end port of the cylindrical component (100) is provided with a cap (130); the main board (800) comprises an external interface board (810), and the external interface board (810) passes through the avoidance hole (422) from the main board cavity (430) into a cylindrical cavity (120) of the cylindrical component (100); and the cap (130) is provided with an interface (131) for connecting the external interface board (810).

16. The multi-lens camera of claim 11, wherein a bottom wall of the main housing (410) is provided with at least two first support pillars (411) dispersedly arranged, and the first support pillars (411) are supported between the main board (800) and the bottom wall of the main housing (410), and are fixedly connected to the main board (800).

17. The multi-lens camera of claim 16, wherein the bottom wall of the main housing (410) is provided with at least two third support pillars (413) dispersedly arranged, and the third support pillars (413) pass through the main board (800) and are supported at a bottom end of the cylindrical component (100).

18. The multi-lens camera of claim 11, wherein the cylindrical component (100) is fixedly connected to the inner baffle (420) by soldering or by thread connectors.

* * * * *